(12) United States Patent
Usami

(10) Patent No.: US 8,760,632 B2
(45) Date of Patent: Jun. 24, 2014

(54) DISTANCE MEASURING APPARATUS AND DISTANCE MEASURING METHOD

(75) Inventor: Masayuki Usami, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 52 days.

(21) Appl. No.: 13/133,557

(22) PCT Filed: Nov. 9, 2009

(86) PCT No.: PCT/JP2009/005958
§ 371 (c)(1),
(2), (4) Date: Jun. 8, 2011

(87) PCT Pub. No.: WO2011/055418
PCT Pub. Date: May 12, 2011

(65) Prior Publication Data
US 2012/0206707 A1    Aug. 16, 2012

(51) Int. Cl.
*G01C 3/08* (2006.01)
*G01C 3/10* (2006.01)
*G01C 11/12* (2006.01)
*G01S 11/12* (2006.01)

(52) U.S. Cl.
CPC . *G01S 11/12* (2013.01); *G01C 3/10* (2013.01); *G01C 3/08* (2013.01)
USPC ........................................... 356/3.14

(58) Field of Classification Search
CPC ........................................... G01S 11/12
USPC .............. 356/3.01, 3.13, 4.01, 3.14; 701/300, 701/301; 382/106
See application file for complete search history.

(56) References Cited

U.S. PATENT DOCUMENTS

| | | | | |
|---|---|---|---|---|
| 3,434,214 A | * | 3/1969 | Pratt | 33/264 |
| 3,653,769 A | * | 4/1972 | Albright | 356/141.4 |
| 3,918,172 A | * | 11/1975 | Moreau | 356/4.08 |
| 4,614,426 A | * | 9/1986 | Baxter et al. | 356/3.13 |

(Continued)

FOREIGN PATENT DOCUMENTS

| | | |
|---|---|---|
| JP | 60 52710 | 3/1985 |
| JP | 9 48298 | 2/1997 |

(Continued)

OTHER PUBLICATIONS

International Search Report issued Jan. 12, 2010 in PCT/JP09/05958 filed Nov. 9, 2009.

*Primary Examiner* — Luke Ratcliffe
*Assistant Examiner* — Ari M Diacou
(74) *Attorney, Agent, or Firm* — Oblon, Spivak, McClelland, Maier & Neustadt, L.L.P.

(57) ABSTRACT

Provided is a distance measuring apparatus and a distance measuring method enabling measurement of, based on an image, a relative distance from an object even during nighttime. Included are imaging means for taking an image in a traveling direction of an own-vehicle as a taken image; specifying means for respectively specifying combinations of positions, in the taken image, of direct light which is imaged in the taken image and of a reflected light which is a reflection of the direct light on a travel path surface; and measuring means for measuring a relative distance from an object based on the combinations of the positions of the direct light and the positions of the reflected light, which are specified by the specifying means.

15 Claims, 12 Drawing Sheets

(56) References Cited

U.S. PATENT DOCUMENTS

| | | | |
|---|---|---|---|
| 4,637,715 A | 1/1987 | Idesawa | |
| 4,652,749 A * | 3/1987 | Stern | 250/234 |
| 4,688,933 A * | 8/1987 | Lapeyre | 356/3.16 |
| 4,896,962 A * | 1/1990 | Menn et al. | 356/139.03 |
| 4,985,847 A * | 1/1991 | Shioya et al. | 701/36 |
| 5,218,414 A * | 6/1993 | Kajiwara | 356/3.14 |
| 5,874,904 A * | 2/1999 | Hirabayashi et al. | 340/903 |
| 6,407,674 B1 * | 6/2002 | Gallagher | 340/905 |
| 7,612,870 B2 * | 11/2009 | Graff et al. | 356/3.13 |
| 7,839,490 B2 * | 11/2010 | Laughlin | 356/3.13 |
| 8,019,122 B2 * | 9/2011 | Zou et al. | 382/104 |
| 8,417,022 B2 * | 4/2013 | Morimitsu | 382/154 |
| 2002/0176605 A1 * | 11/2002 | Stafsudd et al. | 382/106 |
| 2004/0071316 A1 | 4/2004 | Stein et al. | |
| 2004/0105579 A1 * | 6/2004 | Ishii et al. | 382/154 |
| 2006/0044545 A1 * | 3/2006 | Horn | 356/4.01 |
| 2008/0215241 A1 * | 9/2008 | Hanagasaki | 701/300 |
| 2009/0141260 A1 * | 6/2009 | Kitano | 356/3.11 |
| 2011/0144941 A1 * | 6/2011 | Roberts et al. | 702/152 |
| 2012/0188529 A1 * | 7/2012 | France | 356/3.13 |
| 2013/0190971 A1 * | 7/2013 | Anderson | 701/36 |
| 2014/0022068 A1 * | 1/2014 | Usami | 340/436 |

FOREIGN PATENT DOCUMENTS

| | | |
|---|---|---|
| JP | 9 48299 | 2/1997 |
| JP | 10 9853 | 1/1998 |
| JP | 2004 522956 | 7/2004 |
| JP | 2005 201741 | 7/2005 |
| JP | 2006 31313 | 2/2006 |
| JP | 2007 199932 | 8/2007 |
| JP | 2007 309799 | 11/2007 |

* cited by examiner

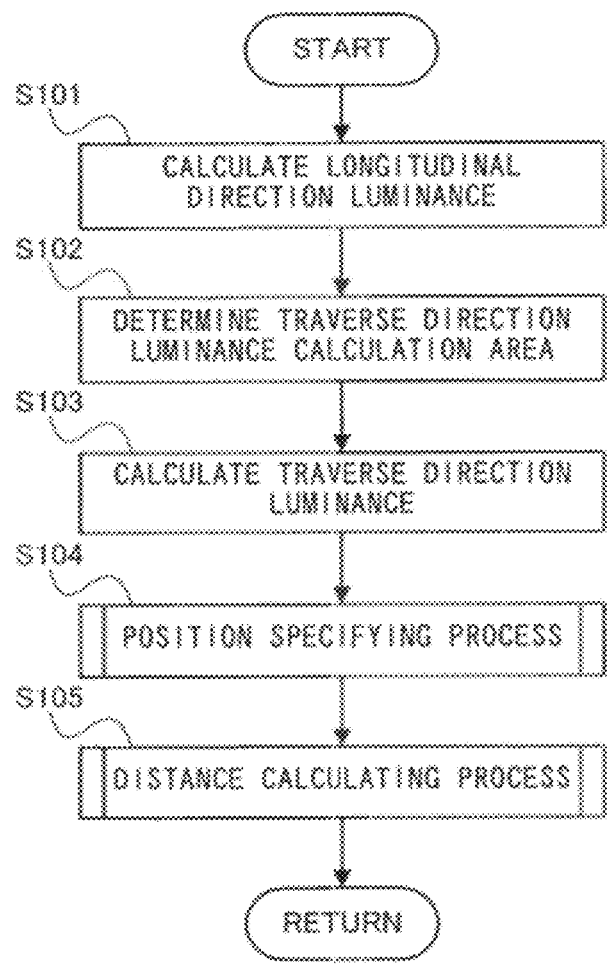
F I G. 7A

F I G. 8
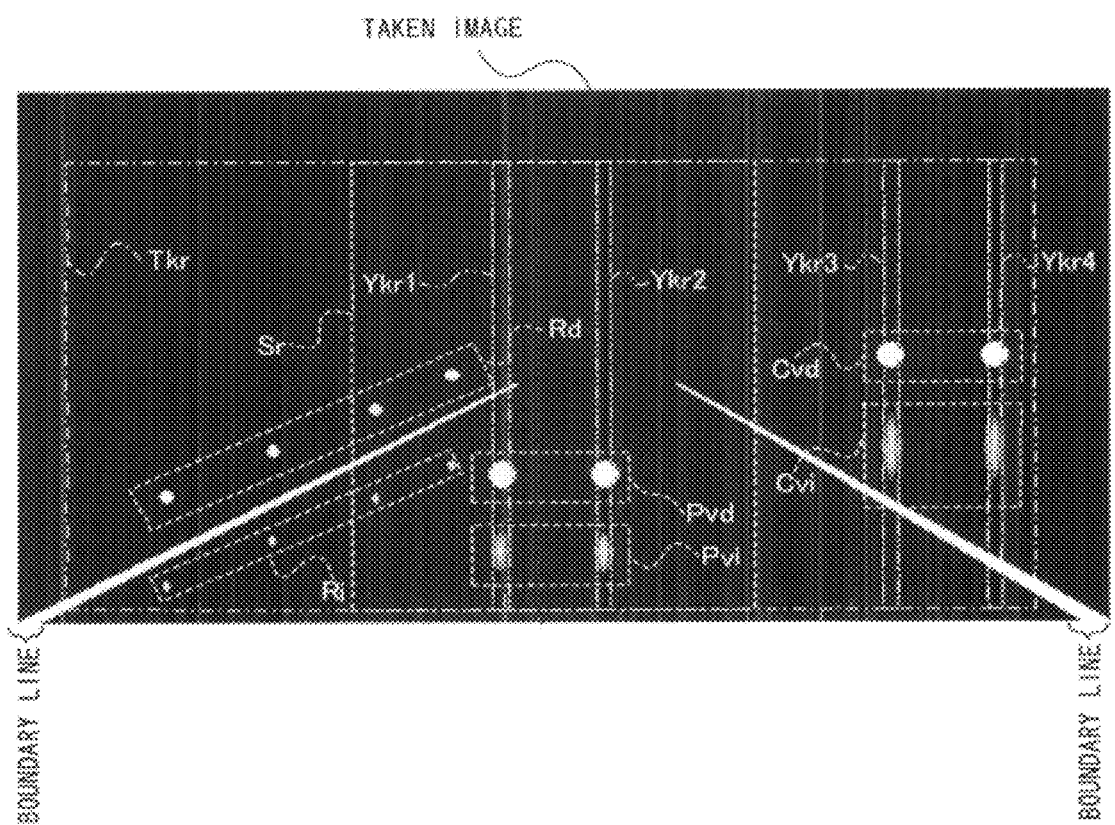

DISTANCE MEASURING APPARATUS AND DISTANCE MEASURING METHOD

TECHNICAL FIELD

The present invention relates to a distance measuring apparatus, and more specifically, relates to a distance measuring apparatus mounted on a movable body such as an automobile.

BACKGROUND ART

Mounted on a movable body such as an automobile and the like in recent years is a distance measuring apparatus using a method for measuring a relative distance from a preceding vehicle, based on an image of a traveling direction taken by a camera. One example of a method for measuring a relative distance from a preceding vehicle is, for example, a position measuring method described in patent literature 1 (hereinafter, referred to as a conventional technology).

In the conventional technology, a straight flat path model image assumed to be an image of a travel path when traveling on a straight flat path is generated based on a taken image. Then, by measuring a relative distance from an object, based on a position of the object from a lower end of the straight flat path model image and based on a position of the object from a lower end of an actual travel path image, the relative distance from the object can be accurately measured even on a travel path having an inclined path.

CITATION LIST

Patent Literature

[PTL 1] Japanese Laid-Open Patent Publication No. H09-48299

SUMMARY OF THE INVENTION

Problems to be Solved by the Invention

However, the conventional technology described above has a problem described in the following. Namely, used in the conventional technology described above is a method for measuring a relative distance from the object based on the distance between the position of the object and the lower end of the travel path image. However, the object will not be clearly imaged in an image taken during nighttime (as shown in FIG. 2, a grounding position of a tire of the object is not clearly imaged with the conventional technology). Therefore, with the conventional technology, the relative distance from the object cannot be measured during nighttime based on the image.

Therefore, an objective of the present invention is to provide a distance measuring apparatus and a distance measuring method enabling measurement of, based on an image, the relative distance from the object even during nighttime.

Solution to the Problems

In order to achieve the above-described objective, the present invention includes the aspects provided in the following.

A first aspect of the present invention includes: imaging means for taking an image in a traveling direction of its own-vehicle as a taken image; specifying means for respectively specifying combinations of positions, in the taken image, of direct light which is imaged in the taken image and of reflected light which is a reflection of the direct light on a travel path surface; and measuring means for measuring a relative distance from an object based on the combinations of the positions of the direct light and the positions of the reflected light, which are specified by the specifying means.

In a second aspect of the present invention, with regard to the above described first aspect, the specifying means includes: first generating means for generating a longitudinal direction integrated luminance distribution by integrating, for every pixel column in the longitudinal direction of the taken image, luminance values of pixels included in a first area predetermined in the taken image; area specifying means for specifying, by comparing the longitudinal direction integrated luminance distribution and a predetermined first threshold value, a second area in which a combination of the direct light and the reflected light is imaged in the taken image; and second generating means for generating, for each of the second areas, a corresponding transverse direction integrated luminance distribution by integrating, for every pixel column in the transverse direction of the taken image, luminance values of pixels included in each of the second areas in the taken image, and wherein the measuring means measures the relative distance from the object based on the combinations of the positions of the direct light and the positions of the reflected light, which are specified based on the transverse direction integrated luminance distributions.

In a third aspect of the present invention, with regard to the above described second aspect, the specifying means further includes: storing means for storing a predetermined first peak threshold value, a second peak threshold value which is predetermined to be lower relative to the first peak threshold value, a predetermined first distribution width threshold value, and a second distribution width threshold value which is predetermined to be larger relative to the first distribution width threshold value; and combination specifying means for specifying the combinations of the positions of the direct light and the positions of the reflected light, based on a result of comparing peak values resulting from each of the transverse direction integrated luminance distributions generated by the second generating means to the second peak threshold value and the first peak threshold value, and based on a result of comparing distribution widths resulting in the peak values of the transverse direction integrated luminance distributions to the first distribution width threshold value and the second distribution width threshold value, and wherein the measuring means measures the relative distance from the object based on the combinations of the positions of the direct light and the positions of the reflected light specified by the combination specifying means.

In a fourth aspect of the present invention, with regard to the above described third aspect, the combination specifying means includes: direct light specifying means for specifying, in the transverse direction integrated luminance distributions, a distribution of a part where a peak value is larger than the first peak threshold value and where a width of the distribution is smaller than the first distribution width threshold value, and specifying, as the position of the direct light, a position where a peak value of the specified distribution is produced in the longitudinal direction of the taken image; and reflected light specifying means for specifying, in the transverse direction integrated luminance distributions, a distribution of a part where a peak value is within a range between the first peak threshold value and the second peak threshold value and where a width of the distribution is larger than the second distribution width threshold value, and specifying, as the position of the direct light, a position where a peak value of the specified distribution is produced in the longitudinal direction of the taken image, and wherein the combination specifying means specifies and combines the position of the direct light and the position of the reflected light specified respectively, by the direct light specifying means and the reflected light specifying means, from transverse direction integrated luminance distributions that are identical.

In a fifth aspect of the present invention, with regard to the above described fourth aspect, the area specifying means specifies the second area by comparing the first threshold value to the longitudinal direction integrated luminance distribution corresponding to a preceding vehicle existence region which is predetermined as an area where a preceding vehicle exists in the taken image.

With regard to the above described fifth aspect, a sixth aspect of the present invention further includes angular velocity detecting means for detecting a rotational angular velocity about an axis that passes through a center of gravity of the own-vehicle in a vertical direction, wherein the area specifying means moves the preceding vehicle existence region in the taken image depending on a turning direction and a turning velocity of the own-vehicle determined based on the rotational angular velocity detected by the angular velocity detecting means.

A seventh aspect of the present invention includes: an imaging step of taking an image in a traveling direction of one's own-vehicle as a taken image; a specifying step of respectively specifying combinations of positions, in the taken image, of direct light which is imaged in the taken image and of reflected light which is a reflection of the direct light on a travel path surface; and a measuring step of measuring a relative distance from an object based on the combinations of the positions of the direct light and the positions of the reflected light, which are specified at the specifying step.

Advantageous Effects of the Invention

According to the present invention, a distance measuring apparatus and a distance measuring method, which enable measuring, based on an image, a relative distance from an object even during nighttime, can be provided.

BRIEF DESCRIPTION OF THE DRAWINGS

FIG. 7A is a flowchart showing processes of a distance measuring section.

FIG. 8 is a figure showing one example of a preceding vehicle existence region.

DESCRIPTION OF EMBODIMENTS

First Embodiment

Figure 1:
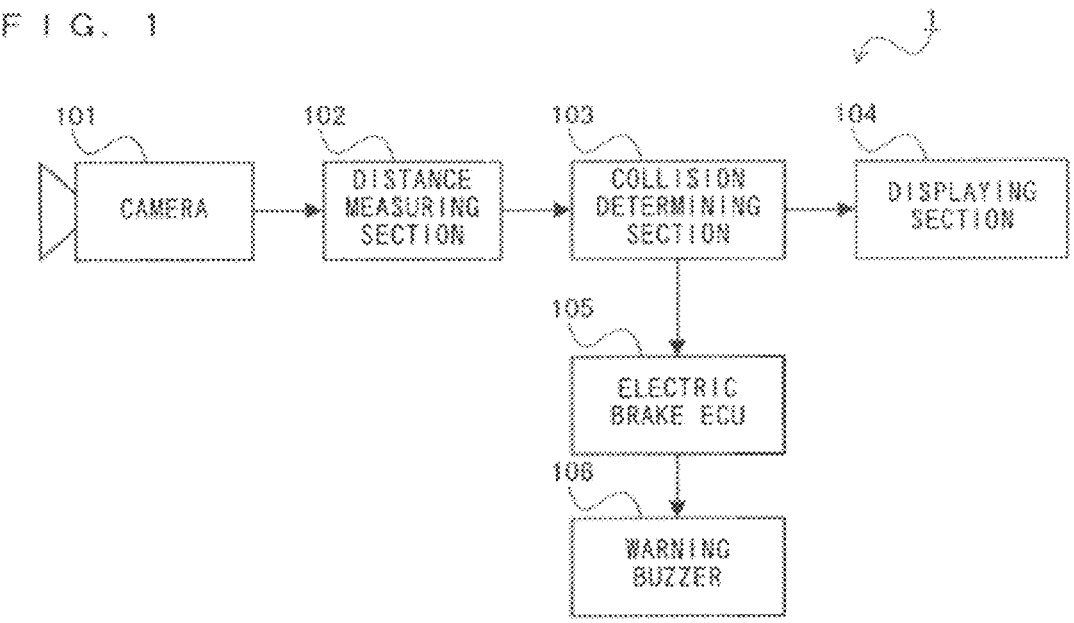
FIG. 1 is a block diagram showing an outlined configuration of a distance measuring apparatus according to a first embodiment.

FIG. 1 is a block diagram showing an outlined configuration of a distance measuring apparatus 1 according to a first embodiment of the present invention. The distance measuring apparatus 1 according to the present embodiment includes a camera 101, a distance measuring section 102, a collision determining section 103, a displaying section 104, an electric brake ECU 105, and a warning buzzer 106. In the present embodiment, the distance measuring apparatus 1 will be described assuming it is mounted on a movable body (hereinafter, referred to as an own-vehicle) such as an automobile and the like.

Figure 2A:
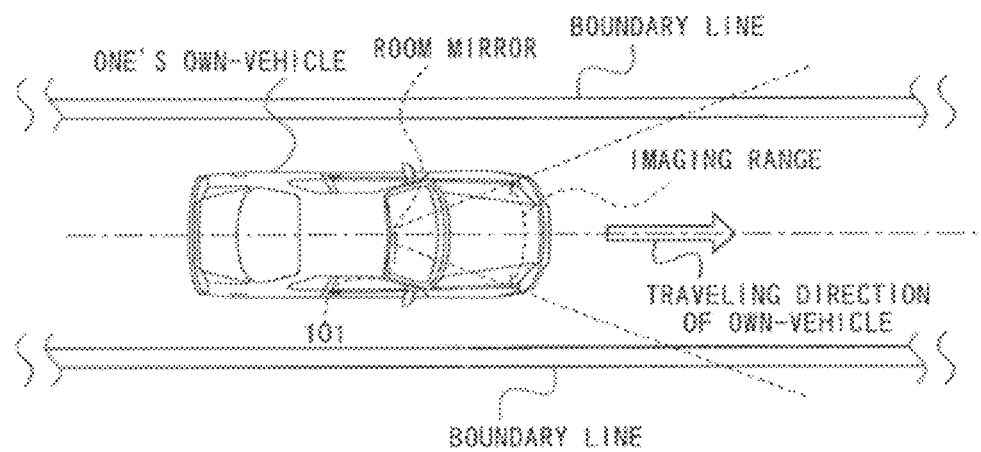
FIG. 2A is a figure showing one example of a mounted position and an imaging range of a camera.
Figure 2B:
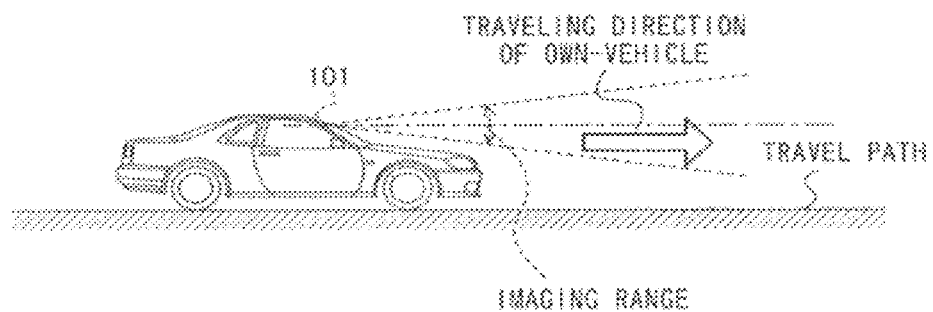
FIG. 2B is a figure showing one example of a mounted position and an imaging range of a camera.

The camera 101 is a CCD (Charge Coupled Device) camera. FIG. 2A and FIG. 2B are figures each showing one example of a mounting part and an imaging range of the camera 101 in one's own-vehicle. FIG. 2A is a plain view looking down in the vertical direction on the own-vehicle while it is traveling, and FIG. 2B is a right side surface view of the own-vehicle shown in FIG. 2A. As shown in the one example in FIG. 2A and FIG. 2B, the camera 101 is attached to a room mirror of the own-vehicle so as to be able to take an image in a traveling direction of the own-vehicle. As shown in both FIG. 2A and FIG. 2B, the camera 101 consecutively takes images in the traveling direction of the own-vehicle (for example, takes an image once (one frame) every one twenty-fourth of a second), and generates image data representing the image that has been taken (hereinafter, referred to as a taken image) every time an image is taken.

The distance measuring section 102 acquires the image data generated by the camera 101, and measures a relative distance between the own-vehicle and a preceding vehicle based on the taken image. After measuring the relative distance from the preceding vehicle, the distance measuring section 102 generates distance data representing the measured relative distance. Details of the processes conducted by the distance measuring section 102 for measuring the relative distance from the preceding vehicle is described below.

When the distance measuring section 102 generates the distance data, the collision determining section 103 acquires the generated distance data. After acquiring the distance data, the collision determining section 103 determines the possibility of collision between the own-vehicle and the preceding vehicle based on the relative distance represented by the acquired distance data; and if it is determined that there is a possibility of a collision, the collision determining section 103 generates a danger signal indicating that there is a possibility of a collision. Any commonly known technology may be used as the technique that is applied by the collision determining section 103 to determine the possibility of collision based on a relative distance.

Representatively, the displaying section 104 is a display screen which displays information generated by a car navigation system mounted on the own-vehicle, or a display screen which displays the number of rotations of an engine and a traveling velocity of the own-vehicle. Furthermore, the displaying section 104 also includes a process circuit for controlling a content displayed on the display screen. If the danger signal is generated by the collision determining section 103, the displaying section 104 acquires the generated danger signal. After acquiring the danger signal, the displaying section 104 displays, on the display screen, an image indicating that there is a possibility of a collision, and notifies a driver of the possibility of a collision.

The electric brake ECU 105 is an ECU (Electric Control Unit) which controls an electric brake mounted on the own-vehicle. If the danger signal is generated by the collision determining section 103, the electric brake ECU 105 acquires the generated danger signal. After acquiring the danger signal, the electric brake ECU 105 controls a braking force of the electric brake mounted on the own-vehicle so as to reduce the possibility of a collision.

The warning buzzer 106 consists of a loudspeaker capable of outputting an audio toward a vehicle interior of the own-vehicle, a control circuit which controls the loudspeaker to output an audio, and the like. When the danger signal is acquired by the electric brake ECU 105, the warning buzzer 106 makes the previously described loudspeaker to output an alarm toward the vehicle interior, and notifies the driver of the own-vehicle of the possibility of a collision with the preceding vehicle.

Provided above is the description of the outlined configuration of the distance measuring apparatus 1 according to the present embodiment. Described next is a distance measuring process conducted by the distance measuring section 102 to measure the relative distance from the preceding vehicle.

Figure 3:
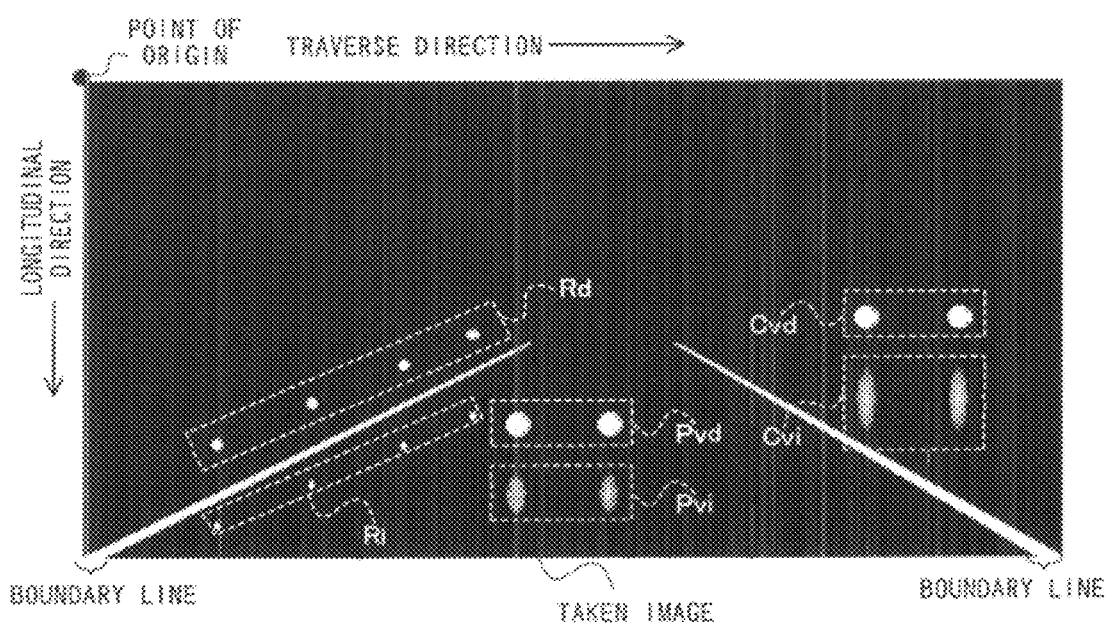
FIG. 3 is a figure showing one example of a taken image that is taken by the camera.

FIG. 3 is a figure showing one example of an image taken when the own-vehicle is traveling during nighttime. In the taken image shown in FIG. 3, objects such as the preceding vehicle, an oncoming vehicle, guidance lights install on a side of a travel path, and the like are imaged. Furthermore, since the taken image shown in FIG. 3 is an image taken during nighttime, details of the outlines of the objects such as the preceding vehicle, the oncoming vehicle, the guidance lights, and the like are not vividly imaged; and direct light, which directly enter the camera 101 from light emitting sections (for example, taillights in case of the preceding vehicle) included in these objects, and reflected light, which are reflections of light emitted from these light emitting sections on a path surface and the like, are vividly imaged.

More specifically, shown in FIG. 3 is one example of an take image in which the followings are vividly imaged: direct light Pvd which directly enters the camera 101 from the taillights of the preceding vehicle; reflected light Pvi which is a reflection, on the path surface, of light emitted from the taillights of the preceding vehicle; direct light Cvd which directly enters the camera 101 from a headlight of the oncoming vehicle; direct light Cvi which is a reflection, on the path surface, of light emitted from the headlight of the oncoming vehicle; direct light Rd which directly enters the camera 101 from the guidance lights; and reflected light Ri which is a reflection of light emitted from the guidance lights on the path surface. In addition, typical boundary lines applied on the surface of the travel path contains a reflective material (for example, glass beads and the like), and the boundary lines which are on both sides of the travel path of the own-vehicle and which reflect light emitted from the headlights of the own-vehicle are also diagrammatically represented in the one example shown in FIG. 3. In the descriptions of the present embodiment, as shown in the one example in FIG. 3, the upper left of the taken image is defined as a point of origin, the horizontal rightward direction from the point of origin is defined as a positive transverse direction of the taken image; and the vertical downward direction from the point of origin is defined as a positive longitudinal direction of the taken image.

Figure 4A:
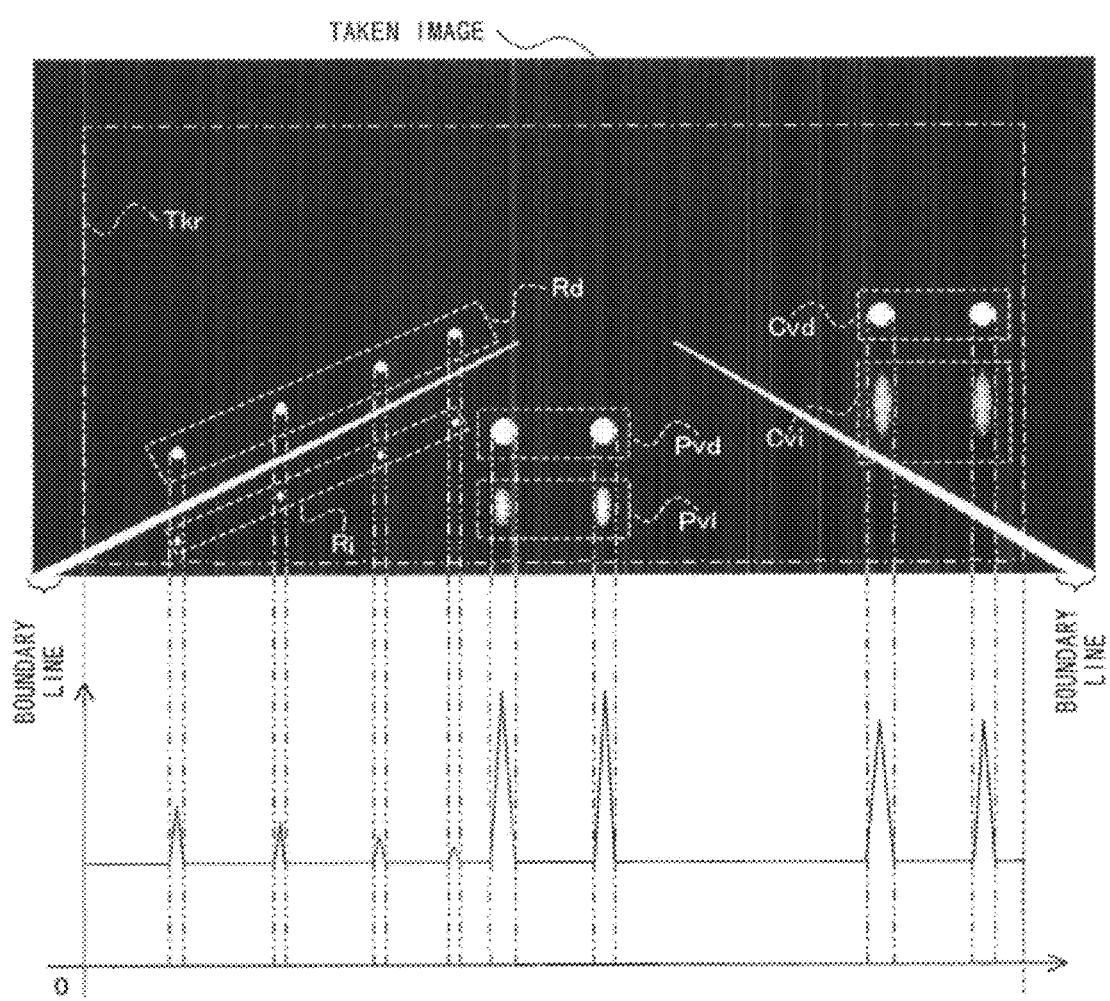
FIG. 4A is a figure showing one example of a longitudinal direction integrated luminance distribution.

When the distance measuring section 102 according to the present embodiment acquires the image data from the camera 101, first, the distance measuring section 102 generates an integrated luminance distribution (hereinafter, referred to as a longitudinal direction integrated luminance distribution) calculated by integrating luminance values of pixels included in the taken image for every pixel column in the longitudinal direction. FIG. 4A is a figure showing, as one example, a longitudinal direction integrated luminance distribution generated by the distance measuring section 102 according to the present embodiment for the taken image shown in the one example in FIG. 3. As shown in FIG. 4A, the distance measuring section 102 according to the present embodiment generates the longitudinal direction integrated luminance distribution by integrating luminance values of pixels within a predetermined longitudinal direction luminance calculation area Tkr for every pixel column in the longitudinal direction.

Figure 4B:
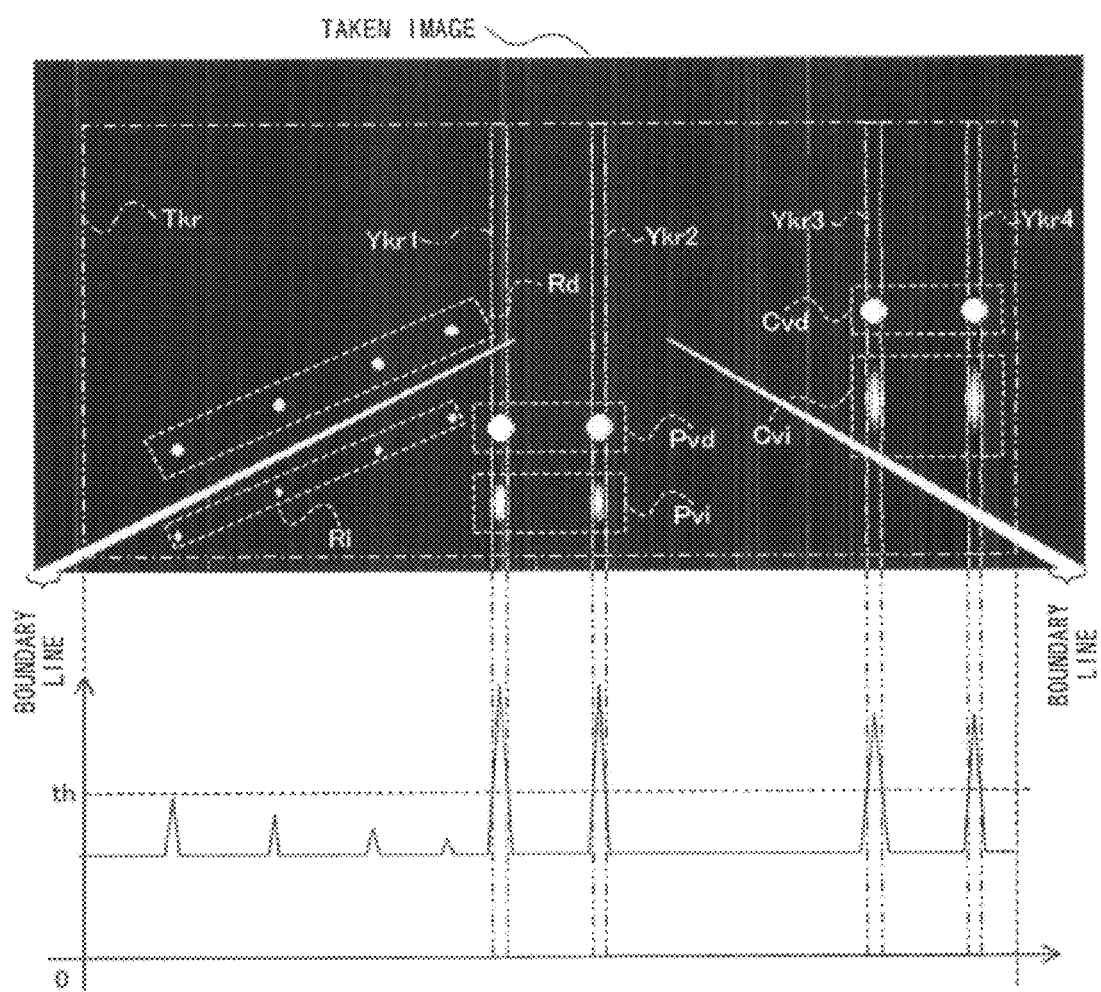
FIG. 4B is a figure showing one example of a threshold value for the longitudinal direction integrated luminance distribution.

After generating the longitudinal direction integrated luminance distribution, the distance measuring section 102 determines, from among the generated longitudinal direction integrated luminance distribution, an area in which an integrated value of luminances becomes equal to or larger than a predetermined threshold value th. FIG. 4B is a figure showing one example of an area determined by the distance measuring section 102 based on the longitudinal direction integrated luminance distribution. As show in FIG. 4B as one example, the distance measuring section 102 determines, as one transverse direction luminance calculation area, an area in the transverse direction resulting from assembling adjacent pixel columns having an integrated value that is equal to or larger than the threshold value th, from among integrated values of luminance of every pixel column as represented by the longitudinal direction integrated luminance distribution. Shown in FIG. 4B as one example is a case in which four areas, which are transverse direction luminance calculation areas Ykr1 to Ykr4, are determined.

A height of the transverse direction luminance calculation area in the longitudinal direction may be a height identical to that in the longitudinal direction luminance calculation area as shown in FIG. 4B as one example, or may be identical to the number of pixels in the longitudinal direction of the taken image, or may be an arbitrary height.

Furthermore, the magnitude of the threshold value th is predetermined to be a value optimal for detecting, as the transverse direction luminance calculation area, an area in which a taillight of the preceding vehicle is imaged within the taken image. More specifically, when the camera 101 takes an image in which an amount of information from a luminance value of a pixel is 8 bits, luminance values of pixels in the taken image are respectively represented in a range from 0 to 255. Here, for example, if the size in the longitudinal direction of the taken image is 100 pixels, a maximum value of the longitudinal direction integrated luminance distribution is 100×255=25500. As an example, the magnitude of the threshold value th in the present embodiment may be predetermined at 10% or 20% of the magnitude of the maximum value, which is 2550 or 5100.

Figure 5A:
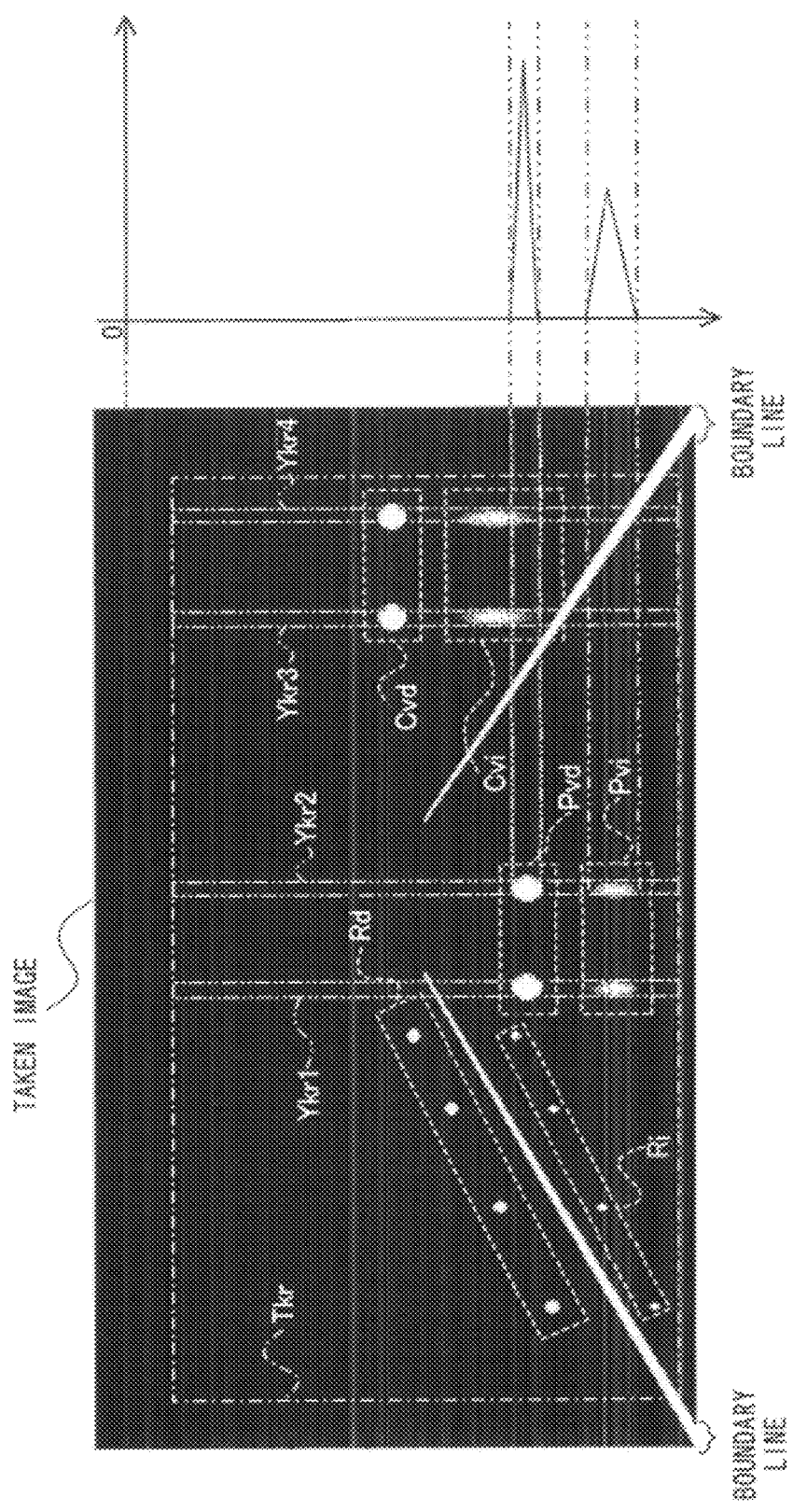
FIG. 5A is a figure showing one example of a transverse direction integrated luminance distribution.

When the distance measuring section 102 determines the transverse direction luminance calculation area, the distance measuring section 102 generates an integrated luminance distribution (hereinafter, referred to as a transverse direction integrated luminance distribution) calculated by integrating luminance values for every pixel column which is in the transverse direction and which is included in the determined transverse direction luminance calculation area. FIG. 5A is a figure showing one example of the transverse direction integrated luminance distribution calculated by the distance measuring section 102 according to the present embodiment for the transverse direction luminance calculation area Ykr2 among the transverse direction luminance calculation areas Ykr1 to Ykr4 shown in FIG. 4B.

Then, after generating the transverse direction integrated luminance distributions so as to correspond to each of the transverse direction luminance calculation areas, the distance measuring section 102 conducts a characteristics detecting process for detecting characteristics of the generated transverse direction integrated luminance distributions.

Figure 5B:
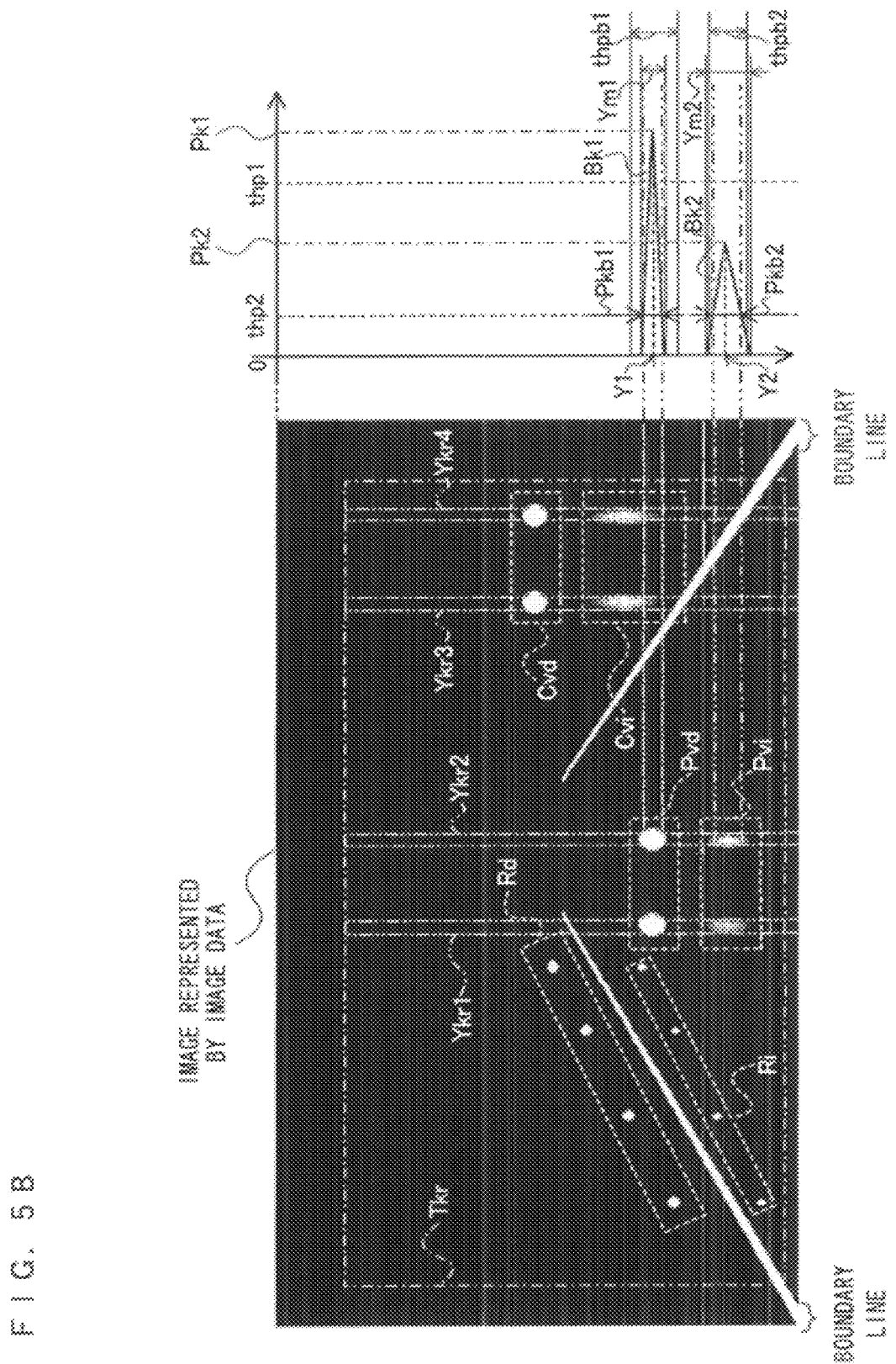
FIG. 5B is a figure showing one example of a direct light position and a reflected light position.

FIG. 5B is a figure showing a calculated transverse direction integrated luminance distribution corresponding to the transverse direction luminance calculation area Ykr2 which is shown in FIG. 5A as one example. In the following, the characteristics detecting process conducted by the distance measuring section 102 according to the present embodiment will be described by using one example in which characteristics of the transverse direction integrated luminance distribution shown in FIG. 5B are detected. When the characteristics detecting process is initiated, first, the distance measuring section 102 extracts, as an extracted curve, each curve that produces each peak value, from a curve representing the generated transverse direction integrated luminance distribution.

When obtaining the extracted curves from the transverse direction integrated luminance distribution, first, the distance measuring section 102 detects positions, which are in the longitudinal direction of the taken image and which produce local maximum values of the transverse direction integrated luminance distribution, as positions (Y1 and Y2 in the example shown in FIG. 5B) that produce the peak values. When the positions that produce the peak values are detected, the distance measuring section 102 detects respective positions where the transverse direction integrated luminance distribution becomes zero on both sides defined by using each of the positions producing each of the peak values as a standard, by scanning the transverse direction integrated luminance distribution toward both sides in the longitudinal direction of the taken image from each of the positions producing each of the peak values; and the distance measuring section 102 extracts each curve representing the transverse direction integrated luminance distribution in each range (Ym1 and Ym2 in the example shown in FIG. 5B) included between both positions, as each of the extracted curves. When the distance measuring section 102 obtains the extracted curves from the transverse direction integrated luminance distribution shown in FIG. 5B, two extracted curves Bk1 and Bk2 are obtained as shown in the same figure.

After obtaining the extracted curves, the distance measuring section 102 specifies a magnitude of an extracted curve's peak value and a curve-width corresponding to each of the extracted curves, and completes the characteristics detecting process. Here, the curve-width is a width between intersection points where the extracted curve and a second peak threshold value thp2, which is described below, intersect.

When the characteristics detecting process is completed, the distance measuring section 102 according to the present embodiment specifies each of the positions, in the longitudinal direction of the taken image, of direct light and reflected light imaged in the transverse direction luminance calculation area, based on the obtained peak value and curve-width of the extracted curve. More specifically, when the characteristics detecting process is completed, the distance measuring section 102 according to the present embodiment compares the obtained peak value of the extracted curve to a first peak threshold value thp1 and to the second peak threshold value thp2, which are predetermined and described below; and compares the obtained curve-width of the extracted curve to a first curve-width threshold value thpb1 and to a second curve-width threshold value thpb2, which are predetermined and described below.

Then, the distance measuring section 102 determines, from among the obtained extracted curves, the extracted curve, whose peak value is larger than the first peak threshold value thp1 and whose curve-width is smaller than the first curve-width threshold value thpb1, as a curve representing the transverse direction integrated luminance distribution resulting from integrating luminance values of pixels indicating the direct light; and the distance measuring section 102 specifies a position which results in a peak value of the curve in the longitudinal direction of the taken image as a direct light position Yd. Furthermore, the distance measuring section 102 determines, from among the obtained extracted curves, the extracted curve Bk2, whose peak value is within a range between the first peak threshold value thp1 and the second peak threshold value thp2 and whose curve-width is larger than the second curve-width threshold value thpb2, as a curve representing the transverse direction integrated luminance distribution resulting from integrating luminance values of pixels indicating the reflected light; and the distance measuring section 102 specifies a position which results in a peak value of the curve in the longitudinal direction of the taken image as a reflected light position Yi.

When the distance measuring section 102 according to the present embodiment compares, to respective threshold values as described above, a peak value Pk1 and a curve-width Pkb1 of the extracted curve Bk1 shown in FIG. 5B as one example; since the peak value Pk1 is larger than the first peak threshold value thp1 and since the curve-width Pkb1 is smaller than the first curve-width threshold value thpb1 as obvious from the same figure, the distance measuring section 102 specifies the position Y1, which results in the peak value Pk1, as the previously described direct light position Yd. Then, since the extracted curve Bk1, which results in the peak value Pk1 to be at the position Y1 specified as the direct light position Yd, is a curve representing one part of the transverse direction luminance distribution of the transverse direction luminance calculation area Ykr2, the distance measuring section 102 according to the present embodiment matches the direct light position Yd to the transverse direction luminance calculation area Ykr2.

On the other hand, when the distance measuring section 102 according to the present embodiment compares, to respective threshold values as described above, a peak value Pk2 and a curve-width Pkb2 of the extracted curve Bk2 shown in FIG. 5B as one example; since the peak value Pk2 is within the range between the first peak threshold value thp1 and the second peak threshold value thp2 and since the curve-width Pkb2 is larger than the second curve-width threshold value thpb2 as obvious from the same figure, the distance measuring section 102 specifies the position Y2, which results in the peak value Pk2, as the previously described reflected light position Yi. Then, since the extracted curve Bk2, which results in the peak value Pk2 to be at the position Y2 which is specified as the reflected light position Yi, is a curve representing one part of the transverse direction luminance distribution of the transverse direction luminance calculation area Ykr2, the distance measuring section 102 according to the present embodiment matches the reflected light position Yi to the transverse direction luminance calculation area Ykr2.

Here, characteristics of an integrated luminance distribution curve of the transverse direction integrated luminance distribution of the pixels indicating the direct light and the reflected light will be described.

First, characteristics of a curve representing the transverse direction integrated luminance distribution of the pixels indicating the direct light will be described. A strength of the direct light will be relatively strong, since the direct light is the light that is emitted from the taillight of the preceding vehicle and that directly enters the camera 101. Therefore, a peak value of the curve representing the transverse direction integrated luminance distribution of the pixels indicating the direct light will be relatively large. Furthermore, the strength of the direct light will not be erratic, since the direct light directly enters the camera 101 without being reflected and scattered on a surface of some sort of an object. Therefore, the curve-width of the curve representing the transverse direction integrated luminance distribution of the pixels indicating the direct light in the taken image will be relatively narrow.

Next, characteristics of a curve representing the transverse direction integrated luminance distribution of the pixels indicating the reflected light will be described. The reflected light is a light resulting from a light emitted from the taillight of the preceding vehicle reflected on the travel path surface before entering the camera 101. Here, the light is also scattered upon reflection since the travel path surface has projections and depressions on a surface thereof. Since the reflected light enters the camera 101 after being reflected and scattered by the travel path surface, the reflected light entering the camera 101 has an erratic and relatively low strength. Therefore, the curve representing the transverse direction integrated luminance distribution of the pixels indicating the reflected light in the taken image has a relatively low peak value, and a curve-width of the curve is relatively wide.

As described above, the respective curves, which represent the transverse direction integrated luminance distribution of the pixels indicating the direct light and the reflected light, display characteristics that are different from each other in the peak values and the curve-widths. In order to specify the positions of the direct light and the reflected light in the taken image by identifying such characteristics; peak threshold values (the first peak threshold value thp1 and the second peak threshold value thp2 in the present embodiment), which are to be compared to the peak value of the extracted curve obtained from the transverse direction luminance distribution as described above, and curve-width threshold values (the first curve-width threshold value thpb1 and the second curve-width threshold value thpb2 in the present embodiment), which are to be compared to the curve-width of the extracted curve, are respectively predetermined in the distance measuring section 102.

Furthermore, as described above, the size is a characteristic of the curve's curve-widths which represent the transverse direction integrated luminance distribution of the pixels indicating the direct light and the reflected light. In order to identify the characteristics, as described above, the distance measuring section 102 specifies the interval between the intersection points of the extracted curve and the second peak threshold value thp2 as the curve-width.

In addition, the distance measuring section 102 according to the present embodiment specifies the extracted curve, whose peak value is larger than the first peak threshold value thp1 and whose curve-width is less than the first curve-width threshold value thpb1, as the curve representing integrated values of the luminance values of the pixels indicating the direct light. Therefore, the first peak threshold value thp1 needs to be predetermined as a relatively large value so as to be able to identify a peak value having the above described relatively large integrated values of the luminance values of the pixels indicating the direct light. Furthermore, the first curve-width threshold value thpb1 needs to be predetermined as a relatively small value so as to be able to identify the above described relatively narrow curve-width of the curve representing the integrated values of the luminance values of the pixels indicating the direct light.

Still further, the distance measuring section 102 according to the present embodiment specifies the extracted curve, whose peak value is within the range between the first peak threshold value thp1 and the second peak threshold value thp2 and whose curve-width is larger than the second curve-width threshold value thpb2, as the curve representing integrated values of the luminance values of the pixels indicating the reflected light. Therefore, the second peak threshold value thp2 needs to be predetermined as a relatively small value so as to allow the above described relatively low peak value of the integrated values of the luminance values of the pixels indicating the reflected light to be within the range between the first peak threshold value thp1 and the second peak threshold value thp2. In addition, the second curve-width threshold value thpb2 needs to be predetermined as a relatively large value so as to be able to identify the above described relatively broad curve-width of the curve representing the integrated values of the luminance values of the pixels indicating the reflected light.

Provided above is the description of the process which is conducted by the distance measuring section 102 according to the present embodiment and which is for respectively specifying the direct light position Yd and the reflected light position Yi after conducting the characteristics detecting process. In the above provided description, described as one example is a case where positions of the direct light and the reflected light, which are in the longitudinal direction of the taken image and which are imaged in the transverse direction luminance calculation area Ykr2 from among the transverse direction luminance calculation area show in FIG. 5B, are respectively specified as the direct light position Yd and the reflected light position Yi. However, the distance measuring section 102 according to the present embodiment specifies, not only for the transverse direction luminance calculation area Ykr2 but also for all the transverse direction luminance calculation areas, each direct light position Yd and each reflected light position Yi after conducting the characteristics detecting process; and matches each of the direct light positions Yd and each of the reflected light positions Yi to each of the transverse direction luminance calculation areas.

After the distance measuring section 102 according to the present embodiment conducts the process of specifying each of the direct light positions Yd and each of the reflected light positions Yi for all the transverse direction luminance calculation areas, the distance measuring section 102 measures the relative distance from the preceding vehicle based on the specified reflected light positions Yi and direct light positions Yd. When measuring the relative distance, the distance measuring section 102 according to the present embodiment measures the relative distance from the preceding vehicle based on positions which are specified so as to correspond the transverse direction luminance calculation areas in which both the direct light position Yd and the reflected light position Yi are specified.

Figure 6:
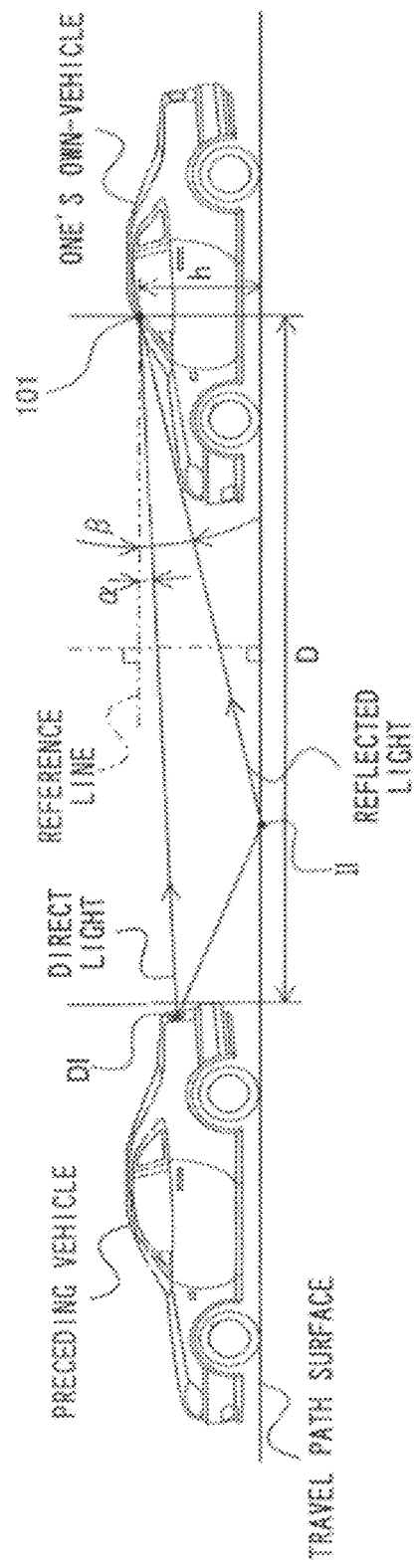
FIG. 6 is a figure showing one example of a positional relationship between the mounted position of the camera, a direct light source, and a reflection position.

FIG. 6 is a figure describing a technique used by the distance measuring section 102 according to the present embodiment for measuring the relative distance from the preceding vehicle based on the direct light position Yd and the reflected light position Yi. FIG. 6 is a left side surface figure, viewing the own-vehicle and the vehicle preceding the own-vehicle from the left side. The preceding vehicle shown in FIG. 6 precedes the own-vehicle by a relative distance D. In addition, in the present embodiment, the camera 101 is mounted at a position having a height h from the travel path surface as shown in FIG. 6 as one example. Furthermore, in FIG. 6, indicated as pitch angle α is a pitch angle between the mounted position of the camera 101 mounted on the own-vehicle and a position where the direct light source Di (for example, the taillights) of the preceding vehicle exists. Still further, in FIG. 6, indicated as pitch angle β is a pitch angle between the mounted position of the camera 101 mounted on the own-vehicle and a reflection position Ii where the direct light source Di of the preceding vehicle reflects on the travel path surface.

The following description below is provided under the assumption in this one example that: the direct light source Di shown in FIG. 6 is the light source existing in the direct light position Yd which is specified so as to correspond to the transverse direction luminance calculation area Ykr2 in the taken image shown in FIG. 5B; and the position of the reflection position Ii in the taken image shown in FIG. 6 is the reflected light position Yi which is specified so as to correspond to the transverse direction luminance calculation area Ykr2 in the taken image shown in FIG. 5B.

It is previously known that a relation of $\alpha = \tan^{-1}(Yd \times Sy/f)$ is satisfied between the pitch angle α shown in FIG. 6 and the direct light position Yd which is specified as described above. Here, Sy is the height of an imaging device of the camera 101, and f is a focal distance of the camera 101. The height of the imaging device of the camera 101 and the focal distance of the camera 101 are both known. Therefore, if the direct light position Yd in the taken image can be specified, the pitch angle α can be obtained.

Similarly, it is previously known that a relation of $\beta = \tan^{-1}(Yi \times Sy/f)$ is satisfied between the pitch angle β shown in FIG. 6 and the reflected light position Yi which is specified as described above. Therefore, if the reflected light position Yi in the taken image can be specified, the pitch angle β can be obtained.

In addition, it is previously known that a relation of $D = h/(\tan \alpha + \tan \beta)$ is satisfied between the pitch angle α, the pitch angle β, and the relative distance D, which are respectively shown in FIG. 6. Therefore, the distance measuring section 102 according to present embodiment can obtain the relative distance D between the preceding vehicle, by obtaining both the pitch angle α and the pitch angle β based on the direct light position Yd and the reflected light position Yi as described above.

The distance measuring section 102 according to the present embodiment calculates, as a relative distance from the preceding vehicle as described above, the relative distance D by obtaining both the pitch angle α and the pitch angle β, for each of the transverse direction luminance calculation areas in which both the direct light position Yd and the reflected light position Yi are specified. When calculating the relative distances D, the distance measuring section 102 according to the present embodiment calculates each of the relative distances D corresponding to each of the transverse direction luminance calculation areas. Then, after calculating the relative distances D, the distance measuring section 102 generates distance data representing each of the calculate relative distances D.

Figure 7B:
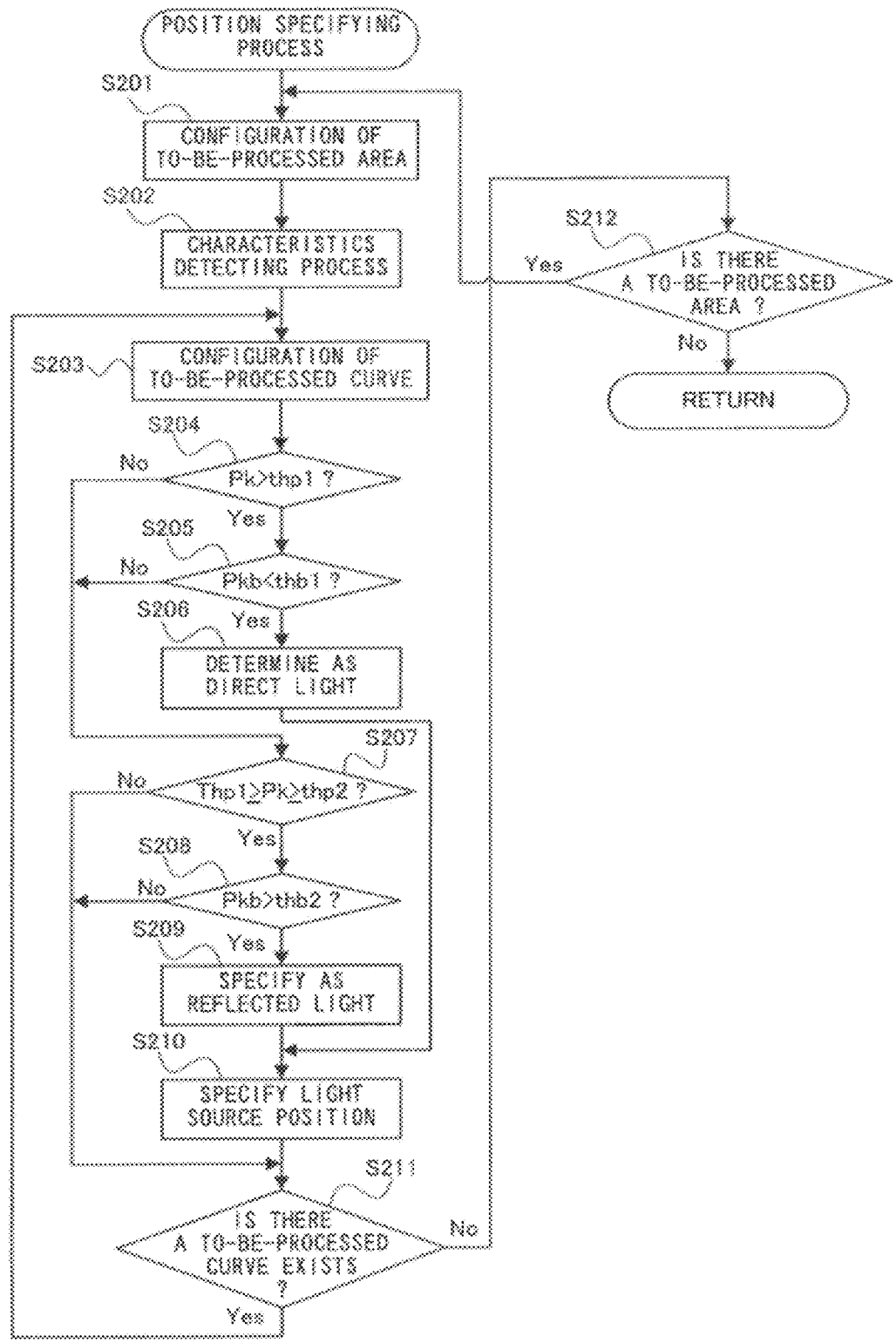
FIG. 7B is a flowchart showing processes of the distance measuring section.
Figure 7C:
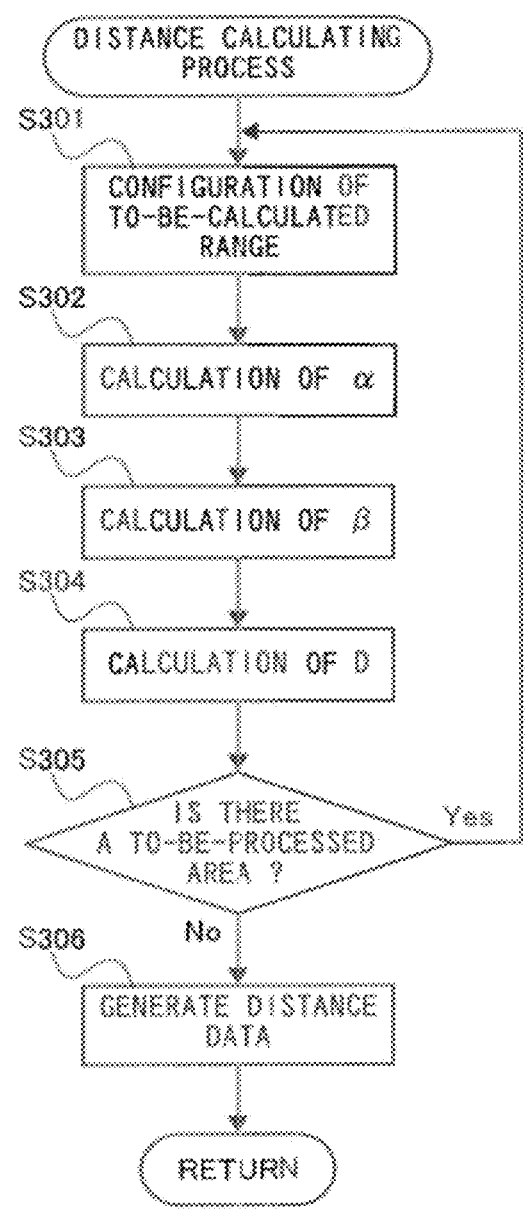
FIG. 7C is a flowchart showing processes of a distance measuring section.

Next, a flow of the specific processes conducted by the distance measuring section 102 according to the present embodiment will be described. FIG. 7A to FIG. 7C are flowcharts showing flows of the processes conducted by the distance measuring section 102 according to the present embodiment.

At step S101, the distance measuring section 102 acquires the image data from the camera 101, and generates the above described longitudinal direction integrated luminance distribution for the taken image represented by the acquire image data.

At step S102, the distance measuring section 102 determines the transverse direction luminance calculation area in the taken image described above, based on the longitudinal direction integrated luminance distribution generated at step S101.

At step S103, the distance measuring section 102 generates, as described above, each of the transverse direction integrated luminance distributions corresponding to all the transverse direction luminance calculation areas determined at step S102.

At step S104, the distance measuring section 102 conducts a position specifying process that specifies the direct light position Yd and the reflected light position Yi corresponding to the transverse direction luminance calculation areas as described above, based on the transverse direction integrated luminance distributions generated so as to correspond to the transverse direction luminance calculation areas at step S103. Details of the position specifying process will be described below.

At step S105, the distance measuring section 102 obtains the relative distance D from the preceding vehicle based on the direct light position Yd and the reflected light position Yi specified at step S104. In addition, after obtaining the relative distance D at step S105, the distance measuring section 102 generates distance data representing the obtained relative distance D.

Next, details of the position specifying process at step S104 will be described with reference to FIG. 7B.

At step S201, the distance measuring section 102 selects an area in which the process of specifying the direct light position Yd and the reflected light position Yi is not conducted, from among the transverse direction luminance calculation areas from which the corresponding transverse direction integrated luminance distributions are generated at step S103; and configures the area as a to-be-processed area.

At step S202, the distance measuring section 102 extracts the two extracted curves Bk1 and Bk2 as described above, from the transverse direction integrated luminance distributions generated at step S103 so as to correspond to the transverse direction luminance calculation areas configured as the to-be-processed area at step S201; and the distance measuring section 102 specifies the peak value and curve-width of each of the obtained extracted curves as the characteristics.

At step S203, the distance measuring section 102 configures, as the to-be-processed curve, among the obtained extracted curve Bk1 and extracted curve Bk2 obtained at step S202, any one of the extracted curves that are not configured to be the to-be-processed curve. When configuring the to-be-processed curve, the distance measuring section 102 may conduct the configuration sequentially starting from an extracted curve existing at a position closest to the point of origin in the taken image in the longitudinal direction from among the extracted curves obtained at step S202, or may randomly conduct the configuration on any one of the extracted curves.

At step S204, the distance measuring section 102 determines whether or not the peak value of the extracted curve configured at step S203 is larger than the first peak threshold value thp1. If it is determined at step S204 that the peak value of the extracted curve configured at step S203 is larger than the first peak threshold value thp1, the distance measuring section 102 advances the process to step S205. On the other hand, if it is determined at step S204 that the peak value of the extracted curve configured at step S203 is not larger than the first peak threshold value thp1, the distance measuring section 102 advances the process to step S207.

At step S205, the distance measuring section 102 determines whether or not the curve-width of the extracted curve configured at step S203 is smaller than the first curve-width threshold value thb1. If it is determined at step S205 that the curve-width is smaller than the first curve-width threshold value thb1, the distance measuring section 102 advances the process to step S206. On the other hand, if it is determined at step S205 that the curve-width is not smaller than the first curve-width threshold value thb1, the distance measuring section 102 advances the process to step S207.

At step S206, the distance measuring section 102 specifies the extracted curve configured at step S203 as a curve representing the integrated values of the luminance values of the pixels indicating the direct light in the taken image. The reason why the distance measuring section 102 can determine the extracted curve as the curve representing the integrated values of the luminance values of the pixels indicating the direct light at step S206 is because, the process at step S206 is conducted when the peak value of the extracted curve is determined to be larger than the first peak threshold value thp1 at step S204 and when the curve-width is determined to be smaller than the first curve-width threshold value thpb1 at step S205, thus satisfying the above described conditions that allow the extracted curve to be determined as the curve representing the direct light.

At step S207, the distance measuring section 102 determines whether or not the peak value of the extracted curve configured at step S203 is within the range between the first peak threshold value thp1 and the second peak threshold value thp2. If it is determined at step S207 that the peak value is within the range between the first peak threshold value thp1 and the second peak threshold value thp2, the distance measuring section 102 advances the process to step S208. On the other hand, if it is determined at step S207 that the peak value is not within the range between the first peak threshold value thp1 and the second peak threshold value thp2, the distance measuring section 102 advances the process to step S211.

At step S208, the distance measuring section 102 determines whether or not the curve-width of the extracted curve configure at step S203 is larger than the second curve-width threshold value thb2. If it is determined at step S208 that the curve-width is larger than the second curve-width threshold value thb2, the distance measuring section 102 advances the process to step S209. On the other hand, if it is determined at step S208 that the curve-width is not larger than the second curve-width threshold value thb2, the distance measuring section 102 advances the process to step S211.

At step S209, the distance measuring section 102 specifies the extracted curve configured at step S203 as a curve representing the integrated values of the luminance values of the pixels indicating the reflected light in the taken image. The reason why the distance measuring section 102 can determine the extracted curve as the curve representing the integrated values of the luminance values of the pixels indicating the reflected light at step S209 is because, the process at step S209 is conducted when the peak value of the extracted curve is determined to be within a range between the first peak threshold value thp1 and the second peak threshold value thp2 at step S207 and when the curve-width is determined to be larger than the second curve-width threshold value thpb2 at step S208, thus satisfying the above described conditions that allow the extracted curve to be determined as the curve representing the reflected light.

At step S210, the distance measuring section 102 specifies a position that produces the peak value of the extracted curve configured at step S203 as the position of the light source. More specifically, since the distance measuring section 102 can determine that the extracted curve configured at step S203 is the curve representing the direct light as described above if the process is advanced from step S206 to step S210; the distance measuring section 102 specifies, corresponding to the transverse direction luminance calculation area configured as the to-be-processed area, a position that produces the peak value in the longitudinal direction of the taken image as the direct light position Yd. On the other hand, since the distance measuring section 102 can determine that the extracted curve configured at step S203 is the curve representing the reflected light as described above if the process is advanced from step S209 to step S210; the distance measuring section 102 specifies, corresponding to the transverse direction luminance calculation area configured as the to-be-processed area, a position that produces the peak value in the longitudinal direction of the taken image as the reflected light position Yi.

At step S211, the distance measuring section 102 determines whether or not there is an extracted curve that is not configured as a to-be-processed curve among the extracted curves extracted, at step S202, from the transverse direction luminance calculation area configured as the to-be-processed area. If the distance measuring section 102 determines that there is an extracted curve that is not configured as a to-be-processed curve at step S211, the distance measuring section 102 returns the process to step S203. On the other hand, if the distance measuring section 102 determines the absence of an extracted curve that is not configured as a to-be-processed curve at step S211, the distance measuring section 102 advances the process to step S212.

At step S212, the distance measuring section 102 determines whether or not there is a transverse direction luminance calculation area that is not configured as a to-be-processed area among the transverse direction luminance calculation areas generated so as to correspond to the transverse direction integrated luminance distribution at step S103. If the distance measuring section 102 determines at step S212 that there is a transverse direction luminance calculation area that is not configured as a to-be-processed area, the distance measuring section 102 returns the process to step S201. On the other hand, if the distance measuring section 102 determines the absence of a transverse direction luminance calculation area that is not configured as a to-be-processed area at step S212, the distance measuring section 102 completes the process shown in the flowchart in FIG. 7B, and advances the process to step S105 in accordance with the flowchart in FIG. 7A.

Next, details of a distance calculating process at step S105 will be described with reference to FIG. 7C.

At step S301, the distance measuring section 102 configures, as a to-be-calculated range, a transverse direction luminance calculation area that is not configure as a to-be-calculated range from among the transverse direction luminance calculation areas which are specified so as to correspond to both the direct light position Yd and the reflected light position Yi at step S104. At step S301, if there is not a single transverse direction luminance calculation area specified by the distance measuring section 102 so as to correspond to both the direct light position Yd and the reflected light position Yi, the process shown in FIG. 7C may be immediately completed, and the process may return to step S101 in accordance with the flowchart shown in FIG. 7A.

At step S302, the distance measuring section 102 calculates the pitch angle α as described above, based on the direct light position Yd which is specified so as to correspond to the transverse direction luminance calculation area configured as a to-be-calculated range at step S301.

At step S303, the distance measuring section 102 calculates the pitch angle β as described above, based on the reflected light position Yi which is specified so as to correspond to the transverse direction luminance calculation area configured as a to-be-calculated range at step S301.

At step S304, the distance measuring section 102 calculates the relative distance D as described above so as to correspond to the transverse direction luminance calculation area configured as the to-be-calculated range at step S301, based on the pitch angle α calculated at step S302, the pitch angle β calculated at step S303, and the known height h of the mounted position of the camera 101 in the own-vehicle.

At step S305, the distance measuring section 102 determines whether or not there is a transverse direction luminance calculation area that is not configured as a to-be-calculated range from among the transverse direction luminance calculation areas which are specified so as to correspond to both the direct light position Yd and the reflected light position Yi at step S104. If the distance measuring section 102 determines that there is a transverse direction luminance calculation area that is not configured as a to-be-calculated range at step S305, the distance measuring section 102 returns the process to step S301. On the other hand, if the distance measuring section 102 determines the absence of a transverse direction luminance calculation area that is not configured as a to-be-calculated range at step S305, the distance measuring section 102 advances the process to step S306.

At step S306, the distance measuring section 102 generates the distance data representing each of the calculated relative distances D, ends the process shown in the flowchart in FIG. 7C, and returns the process to step S101 in accordance with the flowchart in FIG. 7A.

The distance measuring section 102 according to the present embodiment can consecutively measure the relative distance from the preceding vehicle by repeating the processes shown in the flowcharts in FIG. 7A to FIG. 7C at a predetermined time interval.

Furthermore, the processes shown in the flowcharts in FIG. 7A to FIG. 7C can be initiated when, for example, an ignition switch or an accessory switch of the own-vehicle is turned on, and can be ended when any of those are turned off.

Provided above is the description of the processes conducted by the distance measuring section 102 according to the present embodiment. As explained in the above description, the distance measuring section 102 according to the present embodiment specifies the combinations of the positions (the direct light position Yd and the reflected light position Yi) in the taken image of the direct light imaged in the taken image and the reflected light which is a reflection of the direct light on the travel path surface. This can be attained by: specifying the transverse direction luminance calculation area, which is the area within the taken image where the combinations of the direct light and the reflected light are imaged, by comparing the longitudinal direction integrated luminance distribution and the threshold value th; and by specifying, so as to correspond to the same transverse direction luminance calculation area, the direct light position Yd and the reflected light position Yi as described in the first embodiment, based on the extracted curves obtained from the generated transverse direction integrated luminance distributions corresponding to all the transverse direction luminance calculation areas. Then, by calculating the relative distance D as described in the first embodiment, based on the combinations of the direct light position Yd and the reflected light position Yi, the relative distance from an object such as a preceding vehicle can be measured. The extracted curve described in the first embodiment corresponds to the distribution of the part that produces the peak value in the transverse direction integrated luminance distribution.

With the distance measuring section 102 according to the present embodiment, the relative distance from the preceding vehicle can be measured, for example, even during nighttime, based on the direct light emitted from the direct light source mounted on the preceding vehicle and on the reflected light which is a reflection of light emitted from the direct light source on the travel path surface.

In the above-described first embodiment, two extracted curves are obtained from a transverse direction integrated luminance distribution calculated for a single transverse direction luminance calculation area. However, in another one embodiment, the number of the extracted curves obtained from a single transverse direction luminance calculation area is equal to or more than three. In this case, the distance measuring section 102 compares each of the peak values and curve-widths of all the extracted curves to the respective first peak threshold value thp1, second peak threshold value thp2, first curve-width threshold value thpb1, and second curve-width threshold value thpb2, as described in the first embodiment. Then, for example, in a single transverse direction luminance calculation area, if there are two or more extracted curves determined as indicating the direct light, the distance measuring section 102 may randomly decide on either one of the extracted curves, and may specify a position producing a peak value of the extracted curve in the longitudinal direction of the taken image as the direct light position Yd. Similarly, for example, in a single transverse direction luminance calculation area, if there are two or more extracted curves determined as indicating the reflected light, the distance measuring section 102 may randomly decide on either one of the extracted curves, and may specify a position producing a peak value of the extracted curve in the longitudinal direction of the taken image as the reflected light position Yi.

Furthermore, in the above described first embodiment, it has been described that the distance measuring section 102 measures the relative distance D from the preceding vehicle. However, in the above described first embodiment, as shown in FIG. 5B as one example, there are cases where the direct light position Yd and the reflected light position Yi are specified based on a direct light emitted from a headlight from an oncoming vehicle as being the direct light emitted from the direct light source, and a reflected light which is a reflection of the direct light emitted from the direct light source on the travel path surface; and the relative distance from the oncoming vehicle may be calculated as the relative distance from the preceding vehicle based on these positions. Therefore, if allowing a calculation of the relative distance from the oncoming vehicle is not desirable, in another one embodiment, the distance measuring section 102 may calculate the relative distance by: generating, for an image within an area Sr (hereinafter, referred to as a preceding vehicle existence region Sr) in which a preceding vehicle conceivably exists within the taken image as shown in FIG. 8 as one example, the longitudinal direction integrated luminance distribution as described in the first embodiment; determining the transverse direction luminance calculation area based on the generate longitudinal direction integrated luminance distribution; and specifying the direct light position Yd and the reflected light position Yi by conducting the characteristics detecting process in the determined transverse direction luminance calculation area. With this, the distance measuring section 102 can calculate the relative distance from the preceding vehicle based on the light source mounted on the preceding vehicle without being subjected to influences of light sources mounted on objects other than the preceding vehicle, such as an oncoming vehicle.

Figure 9:
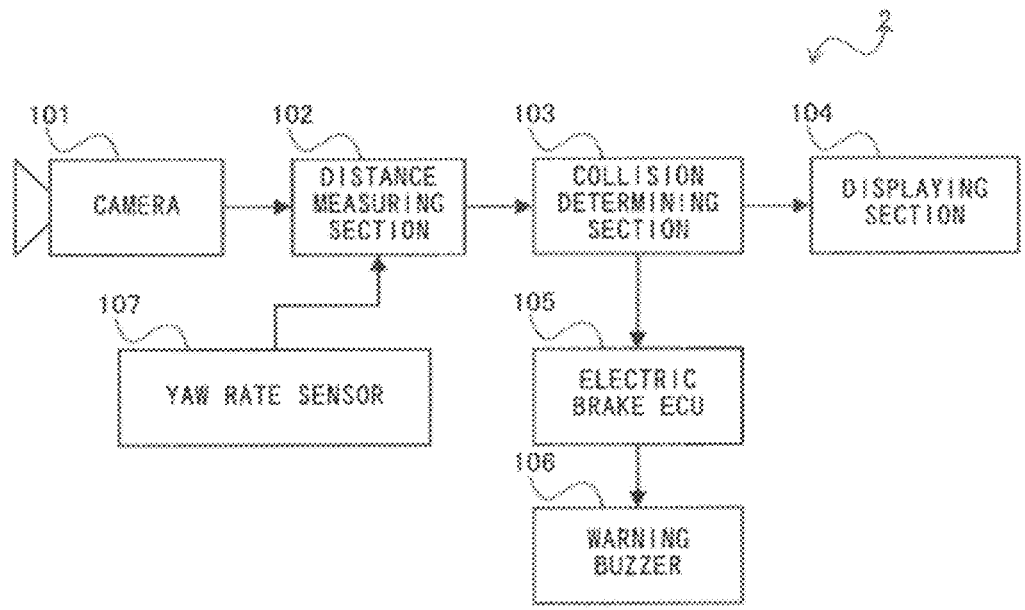
FIG. 9 is a block diagram showing another outlined configuration of the distance measuring apparatus according to the present invention.

Furthermore, when the distance measuring section 102 calculates the relative distance by specifying the direct light position Yd and the reflected light position Yi by conducting the characteristics detecting process only for the transverse direction luminance calculation area determined within the preceding vehicle existence region Sr as described above, there are cases where the direct light source Di mounted on the preceding vehicle deviates away from the preceding vehicle existence region Sr when traveling in a curved path. Therefore, in another one embodiment, the outlined configuration of the distance measuring apparatus 1 according to the first embodiment may be modified as shown in FIG. 9. When compared to the distance measuring apparatus 1 according to the first embodiment, a distance measuring apparatus 2 shown in FIG. 9 differs from that by further including a yaw rate sensor 107.

The yaw rate sensor 107 consecutively detects a rotational angular velocity about an axis that passes through the center of gravity of the own-vehicle in the vertical direction, and generates rotational angular velocity data representing the detected rotational angular velocity.

Then, the distance measuring section 102 included in the distance measuring apparatus 2 acquires the rotational angular velocity data generated by the yaw rate sensor 107. After acquiring the rotational angular velocity data, the distance measuring section 102 determines a direction and curvature of a curve on which the own-vehicle is traveling, based on the rotational angular velocity represented by the acquired rotational angular velocity data, and moves the preceding vehicle existence region Sr in accordance with the determined direction and level of curvature. More specifically, when the rotational angular velocity represented by the rotational angular velocity data indicates that the own-vehicle is traveling on a curved path that curves to the rightward direction, the distance measuring section 102 included in the distance measuring apparatus 2 determines the curvature depending on the magnitude of the rotational angular velocity and moves the preceding vehicle existence region Sr in accordance with the determined curvature in the rightward direction in the taken image. On the other hand, when the rotational angular velocity represented by the rotational angular velocity data indicates that the own-vehicle is traveling on a curved path that curves to the leftward direction, the distance measuring section 102 included in the distance measuring apparatus 2 determines the curvature depending on the magnitude of the rotational angular velocity and moves the preceding vehicle existence region Sr in accordance with the determined curvature in the leftward direction in the taken image.

As a result, even when the own-vehicle or the preceding vehicle is traveling on a curved path, the distance measuring section 102 included in the distance measuring apparatus 2 can measure the relative distance from the preceding vehicle based on the direct light source on the preceding vehicle alone.

Furthermore, in the above described first embodiment, although a CCD camera is used as the camera 101, in another one embodiment, other types of cameras such as a CMOS (Complementary Metal Oxide Semiconductor) camera and the like may be used as the camera 101, as long as it can consecutively take images in the traveling direction of the own-vehicle and can generate image data.

Furthermore, in the above-described first embodiment, when the danger signal is acquired by the electric brake ECU 105, the warning buzzer 106 has outputted an alarm. However, in another one embodiment, the distance measuring apparatus 1 may be configured such that the warning buzzer 106 can directly acquire a danger signal generated by the collision determining section 103, and the warning buzzer 106 may output an alarm when a danger signal generated by the collision determining section 103 is directly acquired.

Furthermore, in the above-described first embodiment, the distance is measured based on image data representing an image taken by the camera 101 during nighttime. In another one embodiment, the distance may be measured as described in the first embodiment, however, based on image data representing an image on which a process of extracting only the direct light or the reflected light is conducted, such as a binarization process or an edge detecting process conducted on the image taken by the camera 101 during nighttime.

Furthermore, the first peak threshold value thp1, the second peak threshold value thp2, the first curve-width threshold value thpb1, and the second curve-width threshold value thpb2 described in the first embodiment may be respectively stored in advance in a storage section that is not diagrammatically represented.

Figure 10:
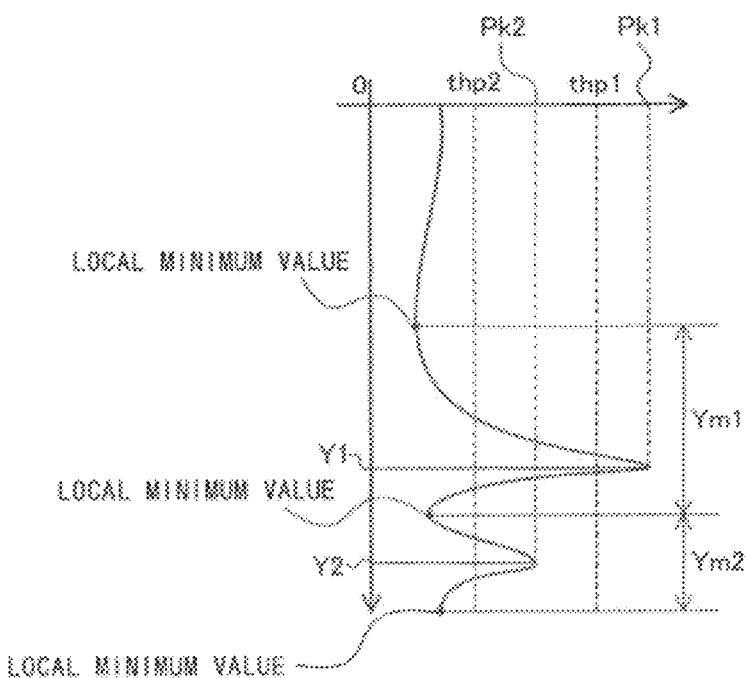
FIG. 10 is a figure showing one example of the transverse direction integrated luminance distribution.

Furthermore, in the above described first embodiment, obtaining the extracted curves from the transverse direction integrated luminance distribution is conducted by: detecting the respective positions where the transverse direction integrated luminance distribution becomes zero on both sides defined by using each of the positions producing each of the peak values as a standard, by scanning the transverse direction integrated luminance distribution toward both sides in the longitudinal direction of the taken image from each of the positions producing each of the peak values in the transverse direction integrated luminance distribution; and extracting the transverse direction integrated luminance distribution in each of the ranges included between both positions, as each of the extracted curves. However, in another one embodiment, for example, as shown in FIG. 10 as one example, when obtaining an extracted curve from a transverse direction integrated luminance distribution that does not become zero but has local minimum values: positions, where the transverse direction integrated luminance distribution reach each of the local minimum values on both sides defined by using positions (Y1 and Y2 in the one example shown in FIG. 10) producing each of the peak values as a standard, may be detected; and the transverse direction integrated luminance distribution in each of the ranges (Ym1 and Ym2 in the one example shown in FIG. 10) included in each of the positions may be extracted as each of the extracted curves.

While the invention has been described in detail, the foregoing description is in all aspects illustrative and not restrictive. It is understood that numerous other modifications and variations can be devised without departing from the scope of the invention.

INDUSTRIAL APPLICABILITY

The present invention can provide a distance measuring apparatus capable of measuring, even during nighttime, a relative distance from a preceding vehicle based on an image; and it is useful, for example, as a distance measuring apparatus mount in a movable body such as an automobile and the like.

DESCRIPTION OF THE REFERENCE CHARACTERS 1 distance measuring apparatus
101 camera
102 distance measuring section
103 collision determining section
104 displaying section
105 electric brake ECU
106 warning buzzer
107 yaw rate sensor

The invention claimed is:

1. A distance measuring apparatus comprising:
    imaging means for taking an image in a traveling direction of its own-vehicle as a taken image;
    specifying means for combining, among direct light which are imaged in the taken image and among reflected light of the direct light reflected on a travel path surface, direct light and reflected light that are imaged as being aligned in a longitudinal direction and specifying respective positions of the direct light and the reflected light; and
    measuring means for measuring a relative distance from an object based on each of the positions of the direct light and the reflected light which are respectively combined by the specifying means.

2. The distance measuring apparatus according to claim 1, wherein
    the specifying means includes:
        imaged area specifying means for specifying an area in which the direct light and the reflected light are imaged as being aligned in the longitudinal direction, based on a value obtained by integrating, in the longitudinal direction, luminance values of pixels in the taken image; and
        position specifying means for combining the direct light and the reflected light that are imaged in an identical area, and specifying respective positions of the direct light and the reflected light in the longitudinal direction, and wherein
    the measuring means measures the relative distance from the object based on each of the positions of the direct light and the reflected light combined by the position specifying means.

3. The distance measuring apparatus according to claim 2, wherein
    the imaged area specifying means includes:
        first generating means for generating a longitudinal direction integrated luminance distribution by integrating, for every pixel column in the longitudinal direction of the taken image, luminance values of pixels in the taken image; and
        area specifying means for specifying an area in which an integrated value indicated by the longitudinal direction integrated luminance distribution is larger than a first threshold value, and wherein
    the position specifying means includes:
        second generating means for generating a transverse direction integrated luminance distribution by integrating, for every pixel column in a transverse direction of the taken image, luminance values of pixels included in the identical area specified by the area specifying means; and
        light position specifying means for combining the direct light and the reflected light and specifying respective positions of the direct light and the reflected light in the longitudinal direction, based on the identical transverse direction integrated luminance distribution, and wherein
    the measuring means measures the relative distance from the object based on each of the positions of the direct light and the reflected light combined by the light position specifying means.

4. The distance measuring apparatus according to claim 3, wherein
    the light position specifying means further includes:
        storing means for storing a first peak threshold value, a second peak threshold value which is lower relative to the first peak threshold value, a first distribution width threshold value, and a second distribution width threshold value which is larger relative to the first distribution width threshold value; and
        longitudinal direction position specifying means for combining the direct light and the reflected light in the taken image and specifying respective positions of the direct light and the reflected light in the longitudinal direction, based on a result of comparing a peak value resulting from the transverse direction integrated luminance distribution to the first peak threshold value and the second peak threshold value, and based on a result of comparing a distribution width resulting in the peak value of the transverse direction integrated luminance distribution to the first distribution width threshold value and the second distribution width threshold value, and wherein
    the measuring means measures the relative distance from the object based on the position of the direct light and the position of the reflected light specified by the longitudinal direction position specifying means.

5. The distance measuring apparatus according to claim 4, wherein
    the longitudinal direction position specifying means further includes:
        direct light specifying means for specifying, in the transverse direction integrated luminance distribution, a distribution of a part where a peak value is larger than the first peak threshold value and where a width of the distribution is smaller than the first distribution width threshold value, and specifying, as the position of the direct light, a position where a peak value of the specified distribution is produced in the longitudinal direction of the taken image;
        reflected light specifying means for specifying, in the transverse direction integrated luminance distribution, a distribution of a part where a peak value is within a range between the first peak threshold value and the second peak threshold value and where a width of the distribution is larger than the second distribution width threshold value, and specifying, as the position of the reflected light, a position where a peak value of the specified distribution is produced in the longitudinal direction of the taken image; and
        combining means for combining the position of the direct light and the position of the reflected light which are respectively specified from the same transverse direction integrated luminance distribution by the direct light specifying means and the reflected light specifying means, and wherein
    the measuring means measures the relative distance from the object based on the position of the direct light and the position of the reflected light which are combined by the combining means.

6. The distance measuring apparatus according to claim 5, wherein the area specifying means specifies an area in which the integrated value, which is indicated by the longitudinal direction integrated luminance distribution corresponding to a preceding vehicle existence region which is predetermined as an area where a preceding vehicle exists in the taken image, is larger than the first threshold value.

7. The distance measuring apparatus according to claim 6 further comprising angular velocity detecting means for detecting a rotational angular velocity about an axis that passes through a center of gravity of the own-vehicle in a vertical direction, wherein
the area specifying means moves the preceding vehicle existence region in the taken image depending on a turning direction and a turning velocity of the own-vehicle determined based on the rotational angular velocity detected by the angular velocity detecting means.

8. A distance measuring method comprising:
an imaging step of taking an image in a traveling direction of one's own-vehicle as a taken image;
a specifying step of combining direct light which is imaged in the taken image and reflected light of the direct light reflected on a travel path surface, and specifying respective positions of the direct light and the reflected light that are imaged as being aligned in a longitudinal direction;
a measuring step of measuring a relative distance from an object based on each of the positions of the direct light and the reflected light which are respectively combined at the specifying step; and
transferring the relative distance to a collision determining section.

9. A distance measuring apparatus comprising:
a camera that takes an image in a traveling direction of its own-vehicle as a taken image; and
a controller that
combines, among direct light which are imaged in the taken image and among reflected light of the direct light reflected on a travel path surface, direct light and reflected light that are imaged as being aligned in a longitudinal direction and specifying respective positions of the direct light and the reflected light, and
measures a relative distance from an object based on each of the combined positions of the direct light and the reflected.

10. The distance measuring apparatus according to claim 9, wherein the controller
specifies an area in which the direct light and the reflected light are imaged as being aligned in the longitudinal direction, based on a value obtained by integrating, in the longitudinal direction, luminance values of pixels in the taken image,
combines the direct light and the reflected light that are imaged in an identical area, and specifies respective positions of the direct light and the reflected light in the longitudinal direction, and
measures the relative distance from the object based on each of the positions of the combined direct light and the reflected light that are imaged in the identical area.

11. The distance measuring apparatus according to claim 10, wherein the controller
generates a longitudinal direction integrated luminance distribution by integrating, for every pixel column in the longitudinal direction of the taken image, luminance values of pixels in the taken image,
specifies an area in which an integrated value indicated by the longitudinal direction integrated luminance distribution is larger than a first threshold value,
generates a transverse direction integrated luminance distribution by integrating, for every pixel column in a transverse direction of the taken image, luminance values of pixels included in the identical area specified by the area specifying means,
combines the direct light and the reflected light and specifies respective positions of the direct light and the reflected light in the longitudinal direction, based on the identical transverse direction integrated luminance distribution, and
measures the relative distance from the object based on each of the positions of the combined direct light and the reflected light in the longitudinal direction.

12. The distance measuring apparatus according to claim 11, wherein the controller
stores a first peak threshold value, a second peak threshold value which is lower relative to the first peak threshold value, a first distribution width threshold value, and a second distribution width threshold value which is larger relative to the first distribution width threshold value,
combines the direct light and the reflected light in the taken image and specifies respective positions of the direct light and the reflected light in the longitudinal direction, based on a result of comparing a peak value resulting from the transverse direction integrated luminance distribution to the first peak threshold value and the second peak threshold value, and based on a result of comparing a distribution width resulting in the peak value of the transverse direction integrated luminance distribution to the first distribution width threshold value and the second distribution width threshold value, and
measures the relative distance from the object based on the specified position of the direct light and the specified position of the reflected light in the longitudinal direction.

13. The distance measuring apparatus according to claim 12, wherein the controller
specifies, in the transverse direction integrated luminance distribution, a distribution of a part where a peak value is larger than the first peak threshold value and where a width of the distribution is smaller than the first distribution width threshold value, and specifies, as the position of the direct light, a position where a peak value of the specified distribution is produced in the longitudinal direction of the taken image,
specifies, in the transverse direction integrated luminance distribution, a distribution of a part where a peak value is within a range between the first peak threshold value and the second peak threshold value and where a width of the distribution is larger than the second distribution width threshold value, and specifies, as the position of the reflected light, a position where a peak value of the specified distribution is produced in the longitudinal direction of the taken image,
combines the position of the direct light and the position of the reflected light which are respectively specified from the same transverse direction integrated luminance distribution, and wherein
measures the relative distance from the object based on the combined positions of the direct light and the reflected light which are respectively specified from the same transverse direction integrated luminance distribution.

14. The distance measuring apparatus according to claim 13, wherein the controller specifies an area in which the integrated value, which is indicated by the longitudinal direction integrated luminance distribution corresponding to a preceding vehicle existence region which is predetermined as an area where a preceding vehicle exists in the taken image, is larger than the first threshold value.

15. The distance measuring apparatus according to claim 14, wherein the controller
- detects a rotational angular velocity about an axis that passes through a center of gravity of the own-vehicle in a vertical direction, and
- moves the preceding vehicle existence region in the taken image depending on a turning direction and a turning velocity of the own-vehicle determined based on the detected rotational angular velocity.

* * * * *